United States Patent [19]
Lee

[11] Patent Number: 6,086,257
[45] Date of Patent: Jul. 11, 2000

[54] SLIDING BEARING AND MANUFACTURING METHOD THEREOF

[76] Inventor: Woo Chun Lee, 4 Da-203, Hyundai Apt. 628, Donam-Dong, Seongbuk-Ku, Seoul, Rep. of Korea

[21] Appl. No.: 09/061,927

[22] Filed: Apr. 17, 1998

[30] Foreign Application Priority Data

| Apr. 19, 1997 | [KR] | Rep. of Korea | 97-14658 |
| Jul. 16, 1997 | [KR] | Rep. of Korea | 97-33090 |
| Mar. 6, 1998 | [KR] | Rep. of Korea | 98-7387 |

[51] Int. Cl.$^7$ .............. F16C 17/00; F16C 33/02; B22F 9/00
[52] U.S. Cl. ............ 384/279; 384/910; 384/129; 75/246
[58] Field of Search ............ 384/129, 276, 384/280, 286, 291, 289, 322, 279, 397, 902, 910, 912, 913; 75/246, 231; 428/553; 252/34; 308/240

[56] References Cited

U.S. PATENT DOCUMENTS

| 2,086,787 | 7/1937 | Whiteley | 384/370 |
| 3,945,695 | 3/1976 | Speakman | 308/240 |
| 4,233,071 | 11/1980 | Bierlein et al. | 75/231 |
| 5,254,273 | 10/1993 | Kageyama et al. | 252/34 |

*Primary Examiner*—David A. Bucci
*Assistant Examiner*—Colby Hansen
*Attorney, Agent, or Firm*—Knobbe, Martens, Olson & Bear LLP

[57] ABSTRACT

A sliding bearing having an improved load-carrying capacity and fatigue strength, by sintering a molded body of iron-based metal mixture powder and concurrently bonding the same to steel-backed metal layer, in which a lubricating oil having the optimal lubrication conditions is impregnated, and providing convenient maintenance and management thereof due to an increased grease non-supplying period, and a manufacturing method of the same. A sliding bearing includes a steel-backed metal layer, and an iron-based sintered alloy layer formed of copper of 10–30 wt % and iron for the residue. The iron-based sintered alloy layer is sintered and concurrently bonded to the steel-backed metal layer. A bush type sliding bearing is formed by inserting a steel-backed metal layer into a mold of a press having cavity for installation of a core at the central portion of the mold and a lower pressing member at the lower portion thereof; filling metal mixture powder formed of copper of 10–30 wt %, graphite of 6.5 wt % or less, and iron for the residue between the core and the steel-backed metal layer and then inserting an upper pressing member into the upper portion of the mold; forming the metal mixture powder into a molded body by selectively applying pressure of 50–300 kgf/cm$^2$ to the upper pressing member and/or the lower pressing member, respectively; and sintering the molded body into a sintered alloy layer by maintaining the molded body together with the steel-backed metal layer under predetermined gas atmosphere at temperature of 1,065° C.–1,095° C. for 3–25 minutes and concurrently bonding the sintered alloy layer to the steel-backed metal layer.

8 Claims, 10 Drawing Sheets

SLIDING BEARING AND MANUFACTURING METHOD THEREOF

BACKGROUND OF THE INVENTION

1. Field of the Invention

The present invention relates to a sliding bearing and a manufacturing method thereof, and more particularly, to a sliding bearing having a sintered alloy layer formed on a steel-backed metal layer by sintering a compacted body made of iron-based metal mixture powder and concurrently bonding the same to the steel-backed metal layer so that load-carrying capacity (permissible load), fatigue strength, and fitting characteristic in the housing are improved, and also having lubricating oil meeting the optimal lubrication conditions impregnated therein so that a grease refilling period is considerably extended, facilitating maintenance of the sliding bearing, and a manufacturing method of the same.

2. Description of the Related Art

In general, a sliding bearing is a machine part for supporting a shaft, a journal, or a counter plate used for a driving or sliding portion of industrial machines such as construction equipments of excavator, forklift, crane, machine tools, presses, injection machines, or vehicles. The sliding bearing can be classified into various types such as a bush type, a half-pipe type, and a plate type, and usually formed by bonding copper-based alloy, aluminum-based alloy, copper-lead-based alloy, or copper-based and synthetic resin-based complex material to a steel-backed metal layer.

The structure of each conventional sliding bearing will be described as follows.

First, a sliding bearing formed by bonding an aluminum-based alloy layer to a steel-backed metal layer includes a steel-backed metal layer, an intermediate layer attached to the steel-backed metal layer, and an aluminum bearing alloy layer attached to the intermediate layer. The aluminum alloy layer includes a small amount of tin (Sn) and silicon (Si), and the intermediate layer is formed of an aluminum alloy layer including a small amount of one or more elements selected from the group consisting of manganese (Mn), copper (Cu), and magnesium (Mg).

Second, a sliding bearing having a copper-lead-based alloy layer has a multi-layered structure composed of a steel-backed metal layer, a copper-lead-based bearing alloy layer combined to the steel-backed metal layer, and a tin-containing lead alloy combined to the bearing alloy layer.

Third, there is a sliding bearing having a bearing layer formed of synthetic resin as a main ingredient which is formed on the surface thereof. In this sliding bearing, a porous metal layer is formed on an inner metal layer such as a steel plate and a bearing layer having lubricating synthetic resin as a main ingredient which covers a surface of the porous metal layer and part of which is impregnated in the pores of the porous metal layer. The bearing layer is formed by solidifying 4-ethylene resin fluoride and solid lubricant so that fine powder particles of the PTFE resin and the solid lubricant cohere each other.

However, the conventional sliding bearings having the above structures have demerits. That is, since the alloy layers contacting the counterpart of the sliding bearing are formed of copper-, copper-tin-, copper-lead-, aluminum-, or synthetic resin-based material exhibiting a relatively low hardness, it is not appropriate to use these sliding bearings for the permissible load over 300–500 kgf/cm$^2$. Also, since it is not possible to increase strength and hardness through heat treatment, wear resistance of the sliding bearing is improved.

To overcome the above problems, as a sliding bearing, a sintered alloy bearing has been used having only an iron-based sintered alloy layer without a steel-backed metal layer. However, the sintered alloy bearing is only used in a small size, i. e., the diameter and length of the bearing are within a range of 5–50 mm, since it is considerably difficult to make the large size sintered bearing have the high density. Furthermore, when solid lubricant is included in the sintered alloy bearing and the high pressure for molding (compacting) is applied to increase the density of the bearing, the solid lubricant acts as an impediment to the sintering so that the strength and load-carrying capacity of the bearing is further reduced. Thus, with the iron-based sintered alloy layer only, low friction and high load-carrying capacity (or high permissible load) cannot be simultaneously achieved.

To solve the above problems, a sliding bearing in which a steel-backed metal layer is bonded to an iron-based sintered alloy layer has been proposed. Here, the sintered alloy layer is required to include at least an iron component of 70 wt % or more and porosity of 10–30%, to satisfy conditions of a predetermined load-carrying capacity, high resistance to fatigue strength and fitting characteristic in the housing, prevention of detachment from the housing, and prevention of oil loss through a rear side. However, a sintered alloy layer satisfying such conditions is not easily overlaid onto the steel-backed metal layer since, when an iron-based mixture powder body of such composition is sintered, the mixture powder body severely shrinks due to densification phenomenon. Also, since the steel-backed metal layer expands at the corresponding sintering temperature, the iron-based sintered body and the steel-backed metal layer are not bonded to each other and thus the bearing is manufactured in a state the iron-based sintered body and the steel-backed metal layer being separated.

Due to the difficulties in bonding the steel-backed metal layer and the sintered alloy layer, in order to manufacture a sliding bearing of which an iron-based sintered alloy layer is bonded to a steel-backed metal layer, a sintered alloy layer is first formed by sintering iron-based metal alloy powder and then the sintered alloy layer is bonded to a steel-backed metal layer by a method such as welding or brazing. In this case, however, a process for manufacturing the sliding bearing is divided into two steps and further pores can be clogged by a filler metal fused during brazing which is easily absorbed in the pores of the sintered alloy layer due to capillary action. As a result, it is difficult to obtain porosity of 10% or more in volume in the sintered alloy layer for impregnation of the lubricant, and brittle structures are formed due to a reaction between the fused filler metal and the sintered alloy so that the sintered alloy layer is brittle against impacts. Also, flux used for brazing remains in the pores of the sintered alloy layer so that the sintered alloy layer can be easily and rapidly corroded, causing a bad effect of the lubricating property of the sliding bearing.

Meanwhile, for the best performance of the lubricant of the sliding bearing, the sintered alloy layer must be impregnated with lubricating oil. However, since the best conditions of impregnation of the lubricating oil for the sliding bearing having an iron-based sintered alloy layer sinter-bonded to a steel-backed metal layer has not been known so far, the performance of the lubricant can not be maximized.

Further, since grease must be frequently refilled as necessary after the conventional sliding bearing is initially installed, the maintenance and management of the sliding bearing is difficult and inconvenient.

OBJECTS OF THE INVENTION

To solve the above problems, it is an objective of the present invention to provide a sliding bearing which can improve dynamic load-carrying capacity (permissible load) including impact load, wear resistance, fatigue strength, and fitting characteristic in the housing and also prevent detachment from housing and the loss of oil through a rear side.

It is another objective of the present invention to provide a sliding bearing in which a self-lubrication is performed smoothly and a dry/wet lubrication is performed altogether.

It is still another objective of the present invention to provide a sliding bearing impregnated with lubricating oil having the optimal viscosity and satisfying lubrication conditions for an iron-based sintered alloy layer.

It is yet another objective of the present invention to provide a sliding bearing having a grease refilling structure so that a frequent, manual replenishing of grease is not needed and a grease refilling period is extended, thereby accomplishing long term trouble-free maintenance.

It is yet further another objective of the present invention to provide a method of manufacturing a sliding bearing by which a sintered alloy layer is formed by sintering an iron-based metal mixture powder molded body (compacted body) and concurrently bonding the sintered body to a steel-backed metal layer.

SUMMARY OF THE INVENTION

Accordingly, to achieve the above objectives, there is provided a sliding bearing including a steel-backed metal layer, and an iron-based sintered alloy layer formed of copper of 10–30 wt % and iron for the balance. The iron-based sintered alloy layer is sinter-bonded (sintered and concurrently bonded) to the steel-backed metal layer.

It is preferable in the present invention that the iron-based sintered alloy layer further includes graphite of 0.1–6.5 wt % and molybdenum disulfide of 0.1–7.0 wt %.

To achieve the above objectives, there is provided a sliding bearing in which lubricating oil having ISO viscosity grade of 100–1,500, kinematic viscosity of 98–1,500 cSt at 40° C., and viscosity index of 120–50, or lubricating oil having ISO viscosity grade of 220–680, kinematic viscosity of 210–670 cSt at 40° C., and viscosity index of 90–110, is impregnated into the iron-based sintered alloy layer.

To achieve the above objectives, there is provided a sliding bearing including a housing having an inlet capable of opening or being closed formed on the outer surface of the steel-backed metal layer, for supporting the sliding bearing, an annular guide groove formed along the outer circumferential surface of the steel-backed metal layer at the position corresponding to the inlet, a plurality of first grease supply holes radially penetrating the steel-backed metal layer along the guide groove, and a second grease supply groove (reservoir) connecting to the first grease supply holes circumferentially extending in the ring shape (annular type) in said iron-based sintered alloy layer. Therefore, the grease injected via the inlet of the housing flows along the guide groove along the outer circumferential surface of the steel-backed metal layer and passes through the first grease supply holes and stored in the second grease supply groove, and finally is supplied to the boundary surface between the sintered alloy layer and the sliding counterpart.

To achieve the above objectives, there is provided a method of manufacturing a bush type sliding bearing by inserting a steel-backed metal layer into a mold of a press having cavity for installation of a core at the central portion of the mold and a lower pressing member at the lower portion thereof; filling metal mixture powder formed of copper of 10–30 wt %, graphite of 6.5 wt % or less, and iron for the balance between the core and the steel-backed metal layer and then inserting an upper pressing member into the upper portion of the mold; forming the metal mixture powder into a molded body by selectively applying pressure of 50–300 kgf/cm$^2$ to the upper pressing member and the lower pressing member, respectively; and sintering the molded body into a sintered alloy layer by maintaining the molded body together with the steel-backed metal layer under predetermined gas atmosphere at temperature of 1,065° C.–1,095° C. for 3–25 minutes and concurrently bonding the sintered alloy layer to the steel-backed metal layer.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

Figure 1:
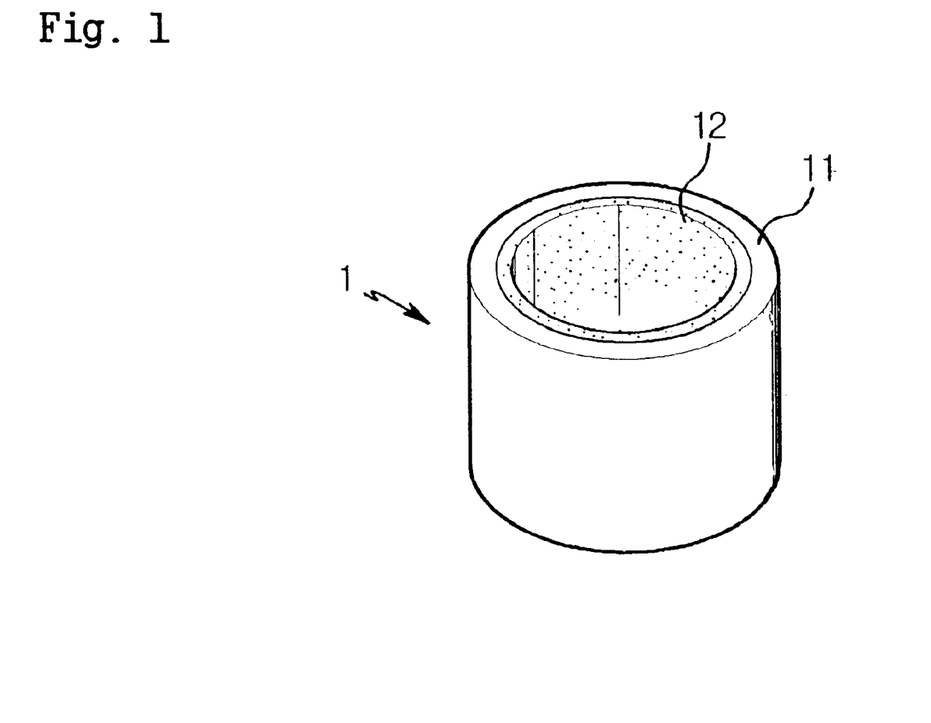
FIG. 1 is a perspective view illustrating a bush type sliding bearing according to the present invention.
Figure 2:
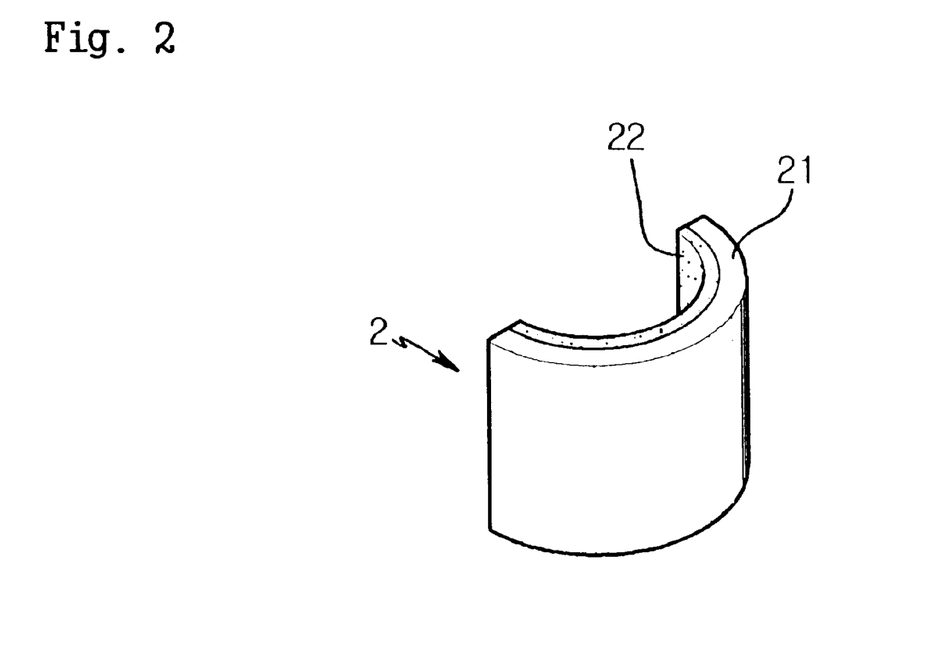
FIG. 2 is a perspective view illustrating a half-pipe type sliding bearing according to the present invention.
Figure 3:
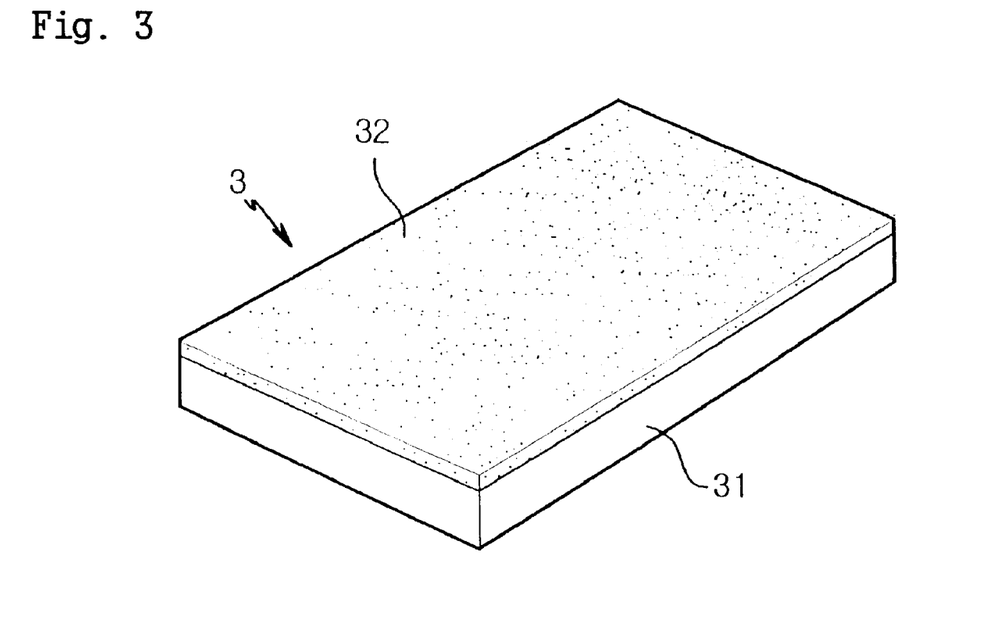
FIG. 3 is a perspective view illustrating a plate type sliding bearing according to the present invention.

A sliding bearing according to the present invention can have various shapes according to the purpose of use, for example, a bush type, a half-pipe type, and a plate type as respectively shown in FIGS. 1 to 3.

Referring to FIGS. 1 and 2, in a bush type sliding bearing 1 and a half-pipe type sliding bearing 2, steel-backed metal layers 11 and 21 are disposed at the outer circumferential surfaces of the respective bearings 1 and 2, and iron-based metal mixture powder is sinter-bonded (concurrently sintered and bonded) to the inner circumferential surface of each steel-backed metal layer. Thus, iron-based sintered alloy layers 12 and 22 are formed on the inner circumferential surfaces of the steel-backed metal layers 11 and 21, respectively. In a plate type sliding bearing 3, as shown in FIG. 3, iron-based metal mixture powder is concurrently sintered and bonded to a surface of a steel-backed metal layer 31 and thus an iron-based sintered alloy layer 32 is formed on the surface of the steel-backed metal layer 31.

According to the preferred embodiment of the present invention, the sintered alloy layers 12, 22, and 32 are preferably comprising of copper (Cu) of 10–30 wt % and iron (Fe) for the residue. Here, graphite of 6.5 wt % or less may be further added to the sintered alloy layers 12, 22, and 32.

Also, according to the present invention, the sintered alloy layers 12, 22, and 32 can further include molybdenum disulfide ($MoS_2$), tin (Sn), nickel (Ni), and manganese (Mg) in addition to iron, copper, and graphite. Here, the composition ratio is preferably copper of 10–30 wt %, graphite of 6.5 wt % or less, molybdenum disulfide of 0.1–7.0 wt %, tin of 2–15 wt %, nickel of 2–15 wt %, manganese of 2–5 wt %, and iron for the residue.

Since the sliding bearings 1, 2, and 3 have the iron-based alloy layers 12, 22, and 32, respectively, a heat treatment is possible to increase strength and hardness.

The graphite or molybdenum disulfide included in the sintered alloy layers 12, 22, and 32 serves as a solid lubricant. However, it is preferable that a liquid lubricant such as lubricating oil is impregnated into the sintered alloy layers 12, 22, and 32 to meet a long-term grease refilling condition.

As the lubricant oil impregnated into the sliding bearing according to the present invention, for a sliding bearing of a general use, gear oil meeting the conditions of ISO viscosity grade of 100–1,500, kinematic viscosity of 98–1, 500 cSt at 40° C., and viscosity index of 120–50 is used according to conditions such as applied load and velocity of a sliding counterpart.

To meet the conditions of heavy permissible load over 300–500 $kgf/cm^2$ and velocity over 5–70 mm/sec, it is preferable to use lubricating oil having ISO viscosity grade of 220–680, kinematic viscosity of 210–670 cSt at 40° C., and viscosity index of 90–110. When the viscosity of lubricating oil is within the above ranges, a frictional coefficient obtained when the sliding counterpart is a chromium-plated hardened carbon steel becomes quite a low value in the range of 0.05–0.15.

In particular, to provide the lubricating oil used for heavy load with extreme-pressure resisting characteristic in addition to the lubrication characteristic, it is preferable that graphite and molybdenum disulfide powders having the grain size less than 200 $\mu$m serving as a solid lubricant, are selectively or altogether added up to 50% in volume ratio as being suspended into the lubricating oil. When the lubricating oil having graphite and molybdenum disulfide powders added in addition to the wet lubricant such as lubricating oil is used, the frictional coefficient obtained in case that the sliding counterpart of chromium-plated hardened carbon steel is 0.07 or less, indicating a stable lubricating performance under application of the extremely-high static pressure and dynamic loads. When graphite and molybdenum disulfide powders are mixed with the liquid lubricant such as lubricating oil, the powders must be completely mixed to be used until they are suspended or reach a paste state.

Meanwhile, the steel-backed metal layer of the present invention is formed of carbon steel, and preferably, is copper-plated to the thickness of 2–10 $\mu$m by electroless plating or electroplating. Here, stainless steel may be used for the steel-backed metal layer.

Figure 4:
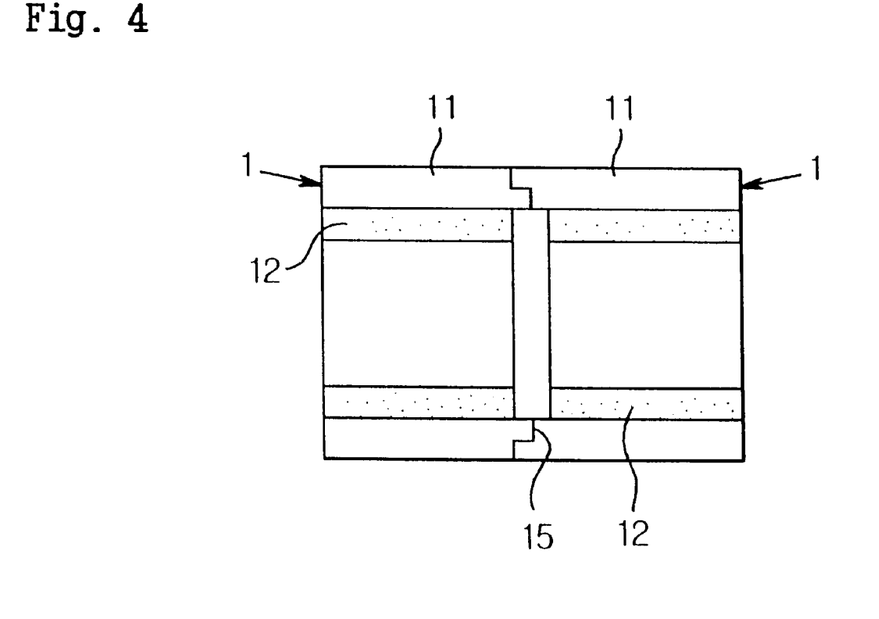
FIG. 4 is a sectional view showing a plurality of the bush type sliding bearings of a diameter as shown in FIG. 1 are welded or bonded together to be lengthy.

Also, according to the present invention, as shown in FIG. 4, a lengthy sliding bearing can be made by welding or bonding a plurality of sliding bearings in a lengthwise direction.

A sliding bearing is installed in a housing to support the sliding counterpart such as a shaft or a journal, and grease is supplied to the sliding bearing.

A sliding bearing having a grease supply structure according to an example of the present invention will be described with reference to the drawings.

Figure 9:
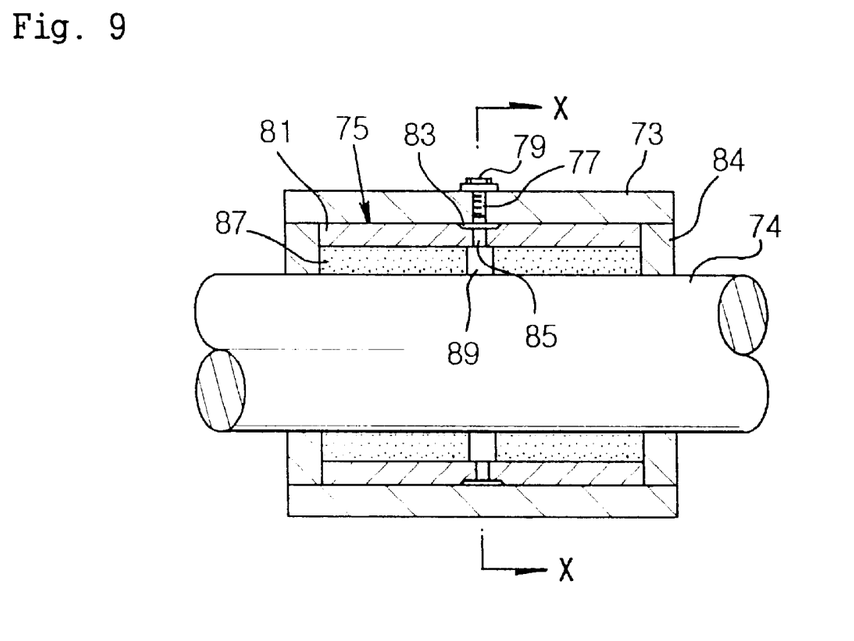
FIG. 9 is a sectional view showing the structure of a grease supply of the sliding bearing shown in FIG. 1.
Figure 10:
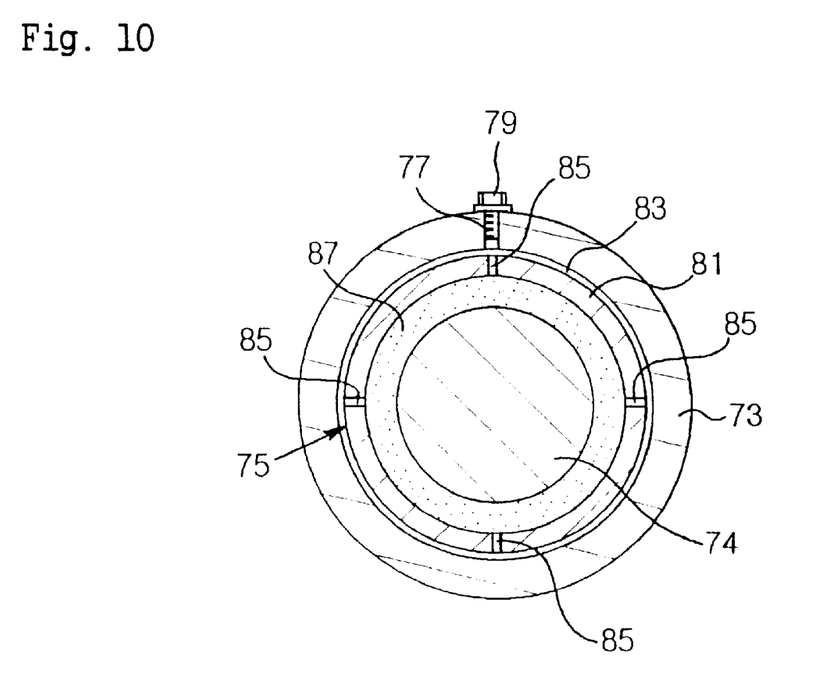
FIG. 10 is a sectional view taken along line X—X of FIG. 9.

Referring to FIGS. 9 and 10, a sliding bearing 75 in which an iron-based sintered alloy layer 87 is bonded to the inner circumferential surface of a steel-backed metal layer 81 is installed inside a housing 73 for supporting a sliding counterpart 74 such as a shaft or a journal, and a dust seal 84 is further installed to both sides of the sliding bearing 75. An inlet 77 for a lubricant is formed at upper side of the housing 73 and a nipple 79 for opening/closing the inlet 77 is coupled to the inlet. An annular guide groove 83 for guiding a lubricant such as grease injected through the inlet 77 toward the outer circumferential surface of the steel-backed metal layer 81 is formed at the outer circumferential surface of the steel-backed metal layer. A plurality of first grease supply holes 85 for guiding the grease injected along the guide groove 83 to the sintered alloy layer 87 are formed along the guide groove. In the present embodiment, as shown in FIG. 10, four first grease supply holes 85 are respectively formed in four perpendicular directions.

A second grease supply groove 89 connecting to the first grease supply holes 85 for guiding the grease flowing via the first grease supply holes 85 to reach a boundary surface between the sintered alloy layer 87 and the sliding counterpart 74, are formed toward the circumferential direction. The second grease supply groove 89 is a ring-shaped or annular type groove formed by removing the sintered alloy layer 87 along the circumferential direction thereof. The width of guide groove 83 and second grease supply groove 89 must be greater than the diameter of each first grease supply hole 85, while the second grease supply groove 89 has no limit in its width. Also, the height of second grease supply groove 85 equals to the thickness of the sintered alloy layer 87.

Thus, when the nipple 79 is detached from the inlet 77 to inject grease, the grease is supplied along the guide groove 83 toward the outer circumferential surface of the steel-backed metal layer 81 and stored in the second grease supply groove 89 passing through the first grease supply holes 85. Thus, the grease is supplied to the boundary surface between the sintered alloy layer 87 and the sliding counterpart 74 whenever the sliding bearing 75 operates. Since the grease supplied to the boundary surface includes graphite or molybdenum disulfide, selectively or altogether, lubrication operations are achieved very effectively due to the combined operation of dry lubrication and wet lubrication, i.e., operations of the solid lubricant, the impregnated oil, and the grease.

The dry lubrication operation by a solid lubricant, graphite or molybdenum disulfide, shows better performance for supporting the sliding counterpart 74 of heavy load which moves at low velocity. Also, since the solid lubricant stored in the second grease supply groove 89 and at the boundary surface hardly leaks or is reduced, a period for refilling the grease is extended for a long term.

When the above-described grease supply structure is applied to a case in which the sliding counterpart 74 is formed of chromium-plated hardened carbon steel, the frictional coefficient between the sliding bearing 75 and the sliding counterpart is maintained within a range of 0.02–0.05, thus considerably reducing the friction therebetween. Further, since most solid lubricant remains in the second grease supply groove 89 and at the boundary surface, together with the grease, only a wet lubricant, e. g., lubricating oil or grease, suffices for refilling, without supplying a solid lubricant.

Figure 11:
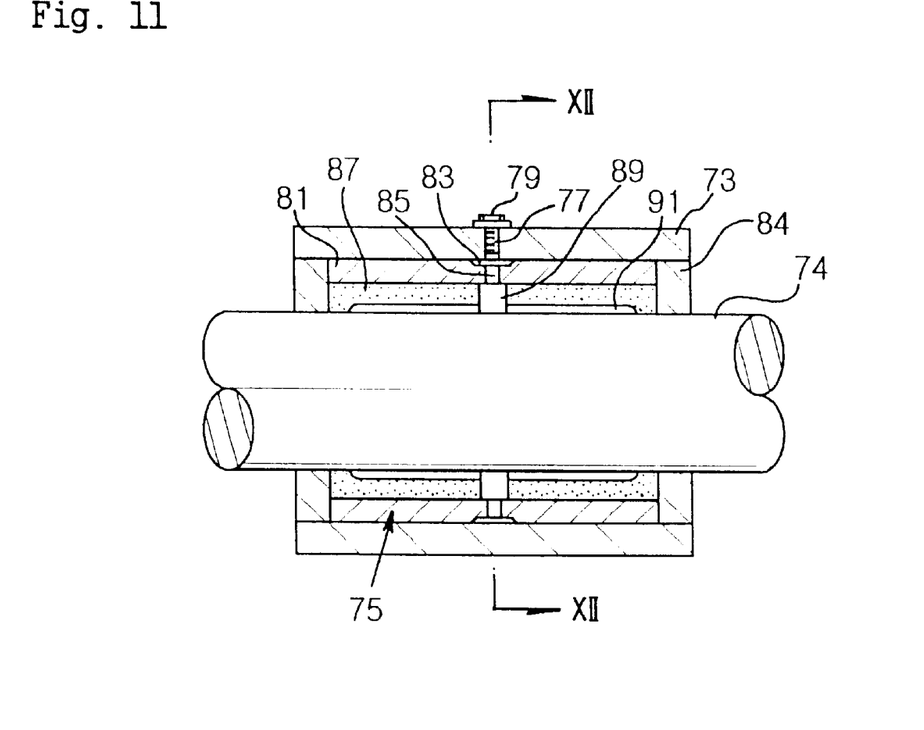
FIG. 11 is a sectional view showing the structure of a grease supply of a sliding bearing according to another preferred embodiment of the present invention.
Figure 12:
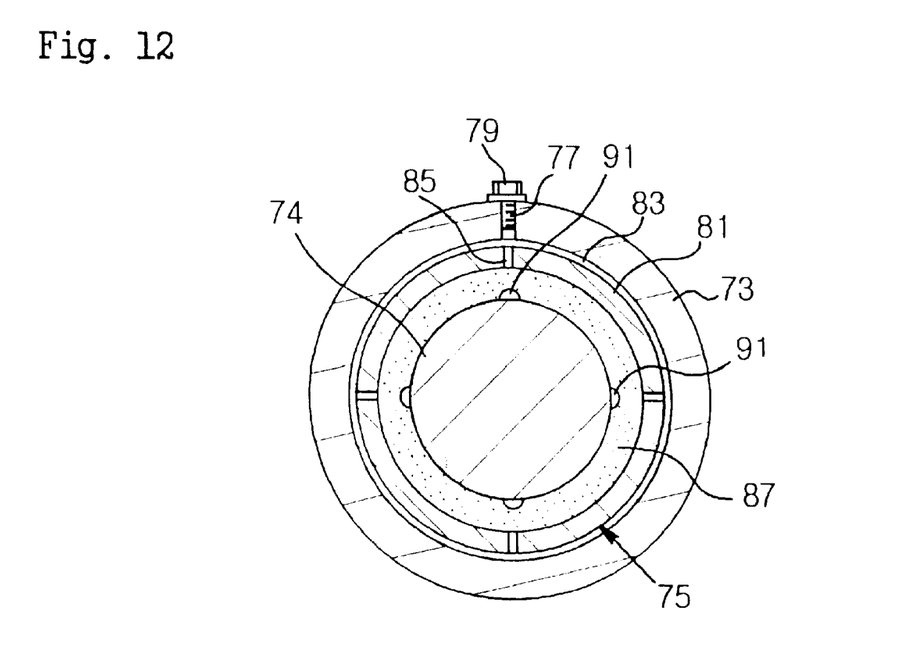
FIG. 12 is a sectional view taken along line XII—XII of FIG. 11.
Figure 13:
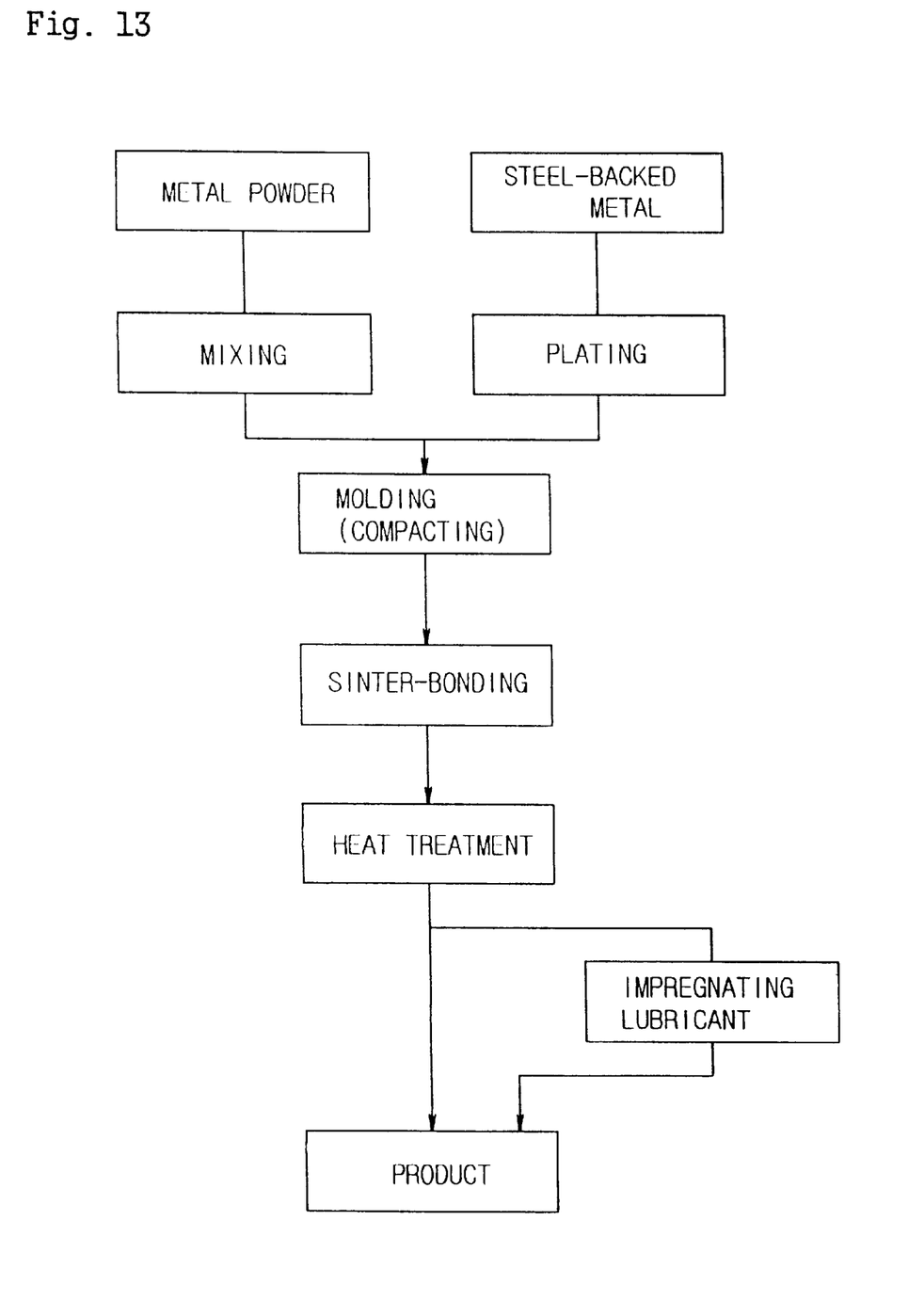
FIG. 13 is a flow chart representing a process of manufacturing a sliding bearing according to the present invention.

Referring to FIGS. 11 and 12, a sliding bearing having a grease supply structure according to another example of the present invention will be described.

Since a grease supply structure according to another example of the present invention has the same structure and operation as the above-described grease supply structure example, except that diffuse grooves 91 are formed on the inner circumferential surface of the sintered alloy layer 87 in an axial direction extending from the second grease supply groove 89, the detailed description thereof will be omitted.

Although the diffuse grooves 91 can be formed into various shapes, it is preferred that the profile of each diffuse groove is half-circular. The grease injected through the inlet 77 flows on the circumferential surface of the steel-backed metal layer 81 along the guide groove 83 and stored in the first grease supply holes 85 and second grease supply groove 89. The stored grease finally flows into the diffuse grooves 91 as the sliding bearing 75 operates. Thus, since the diffuse grooves 91 are formed axially on the inner circumferential surface of the sintered alloy layer 87 and the grease is stored in the diffuse grooves 91, the lubrication operation to the boundary surface between the sintered alloy layer 87 and the sliding counterpart 74 is performed very effectively. Also, since more amount of the lubricant remains on the boundary surface than in the case according to the first example due to the amount stored in the diffuse grooves 91, the period for refilling grease can be further extended.

A method for manufacturing a sliding bearing having the above structure according to the present invention will now be described with reference to the drawings.

Referring to FIGS. 1, 4, 5, and 13, a method of manufacturing a bush type sliding bearing will be first described. In this method, copper-plated steel-backed metal is used for the steel-backed metal layer 11, and preferably, a copper plate layer (not shown) is formed to have a thickness of 2–10 $\mu$m by electroless plating or electroplating.

Figure 5:
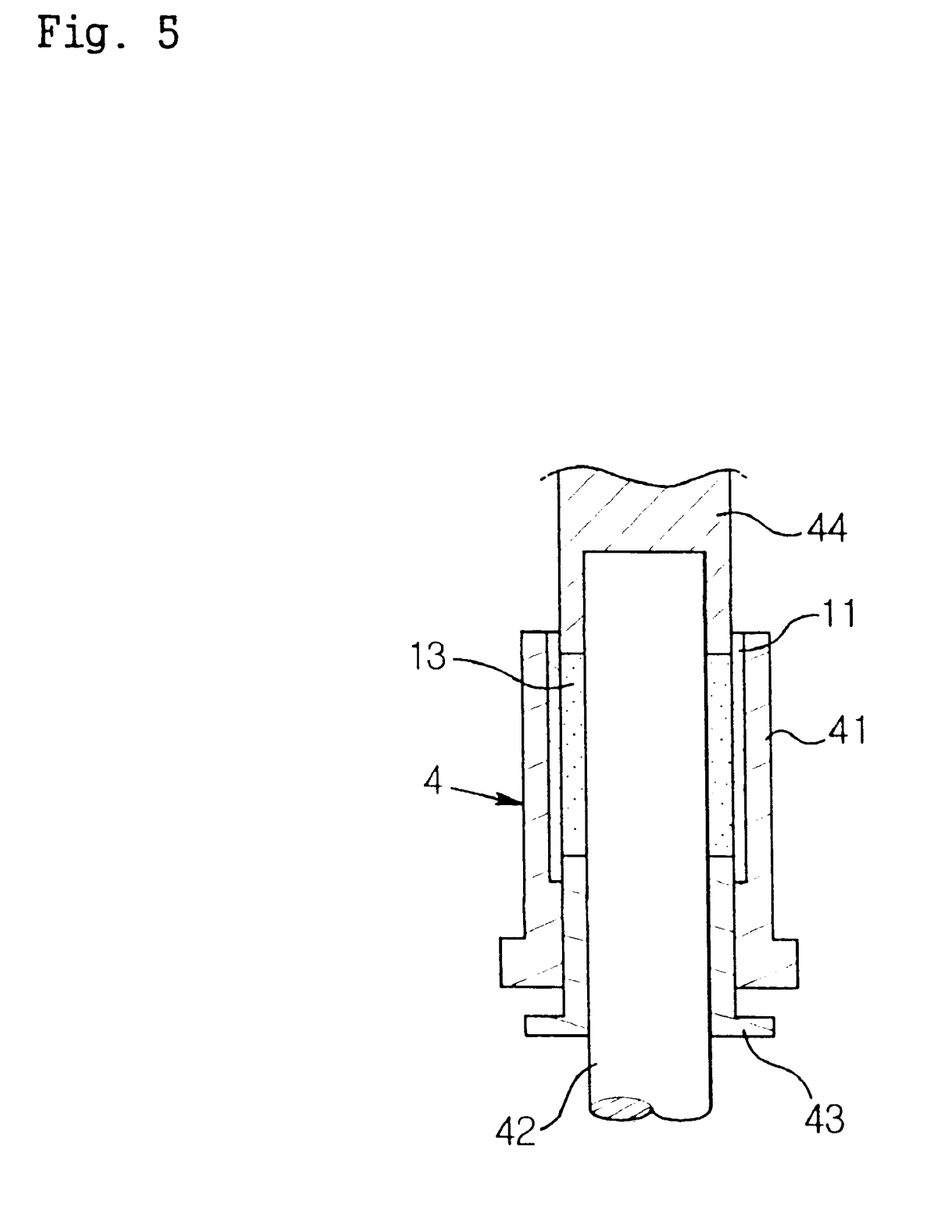
FIG. 5 is a sectional view schematically showing a press for manufacturing the sliding bearing shown in FIG. 1.

Then, metal mixture powder having the above composition ratio is uniformly mixed. Next, the steel-backed metal layer 11 is inserted in a mold 41 of a press 4, in which a core 42 and a lower pressing member 43 are installed at the central and lower portions of the press, respectively. The mixed metal mixture powder is filled between the steel-backed metal layer 11 and the core 42, and an upper pressing member 44 inserts into the upper portion of the mold 41.

Then, a molded body (compacted body) 13 is formed by press-molding the metal mixture powder and then the molded body and the steel-backed metal layer 11 are taken out together. In the press-molding, the upper and lower pressing members 44 and 43 may operate selectively or altogether. The pressure during pressing is preferably maintained between 50–300 kg/cm2 for the respective upper and lower pressures, and the molding pressure is determined in consideration of a desired porosity (the volume ratio of pores with respect to the volume of the entire sintered alloy layer) after sinter-bonding (sintering and bonding) processes which will be described later. It is preferable that the porosity is between 10–30%.

Next, the molded body 13 is heated together with the steel-backed metal layer 11 and is sintered and bonded each other so that the iron-based sintered alloy layer 12 is formed on the steel-backed metal layer 11. The sintering/bonding process is performed under any one gas atmosphere selected from the group consisting of nitrogen, hydrogen, and mixed gas of nitrogen and hydrogen atmospheres, ammonia decomposed gas atmosphere, argon gas atmosphere, vacuum, endothermic and exothermic gas atmosphere. In the nitrogen and hydrogen mixed gas atmosphere, hydrogen is preferably included over 30% in volume ratio with respect to the mixed gas. Also, in the vacuum atmosphere, it is preferable the pressure is $10^{-2}$ torr or less. Further, the sintering is performed at the temperature between 1,065° C.–1,095° C. and the temperature is kept for 3–25 minutes.

When the sintering temperature and time is out of the above ranges, the molded body 13 can be sintered, but not bonded well to the steel-backed metal layer 11. When the molded body 13 is sintered and turned into the sintered alloy layer 12 in the above ranges set for sintering temperature and time, contraction hardly occurs or only a little expansion is generated so that the sintered alloy layer 12 is easily bonded to the steel-backed metal layer 11. However, since liquid-state sintering occurs when the sintering is made above the set ranges for temperature and time while solid-state sintering occurs under the above set ranges, the sintered alloy layer 12 severely contracts and is detached from the steel-backed metal layer 11, making the bonding of the sintered alloy layer and the steel-backed metal difficult. Also, when solid sintering is occurred, strength of the sintered alloy layer 12 is weakened. When the liquid sintering is occurred, copper is fused during the sintering process and fused copper exhibiting high fluidity is formed which flows on the boundary surface between the steel-backed metal layer 11 and the sintered alloy layer 12, or concentrates on any one position, so that pores is irregularly distributed throughout the sintered alloy layer 12, causing ill effect on porosity. Further, as fluidity of the fused copper becomes higher, the contraction rate of the sintered alloy layer 12 becomes higher.

When sintering is made within transition temperature and transition time between each solid-state and liquid-state sintering, copper included in the molded body 13 is fused and fused copper is formed. However, since viscosity of the above fused copper is relatively high, i. e., fluidity is low, the concentration phenomenon that the fused copper flows toward the boundary surface or at any one position thereof can be prevented, thereby making the distribution of the fused copper uniform. Therefore, a degree of clogging of the pores in the sintered alloy layer 12 is reduced so that the pores can be uniformly distributed. Also, owing to the fused copper of high viscosity present between the sintered alloy layer 12 and the steel-backed metal layer 11, the sintered alloy layer is sintered and concurrently bonded (sinter-bonded) together.

The iron-based metal mixture powder not satisfying the above composition ratio is not bonded well, concurrently with sintering thereof. In such a case, a change of the copper content serving as a critical factor in sintering is preferred.

Then, the sliding bearing obtained after sintering and bonding undergoes heat treatment such as carburizing, nitriding, carburizing and nitriding, quenching, or tempering after these treatments, to improve its strength and hardness. These heat treatments are possible since the sintered alloy layer 12 is formed using iron as a main component. When the heat treatment is performed in a continuous furnace, it is preferable that the sliding bearing 1 is transferred from a heating place to a cooling place and then maintained at temperature between 750° C.–950° C. for performing carburizing, nitriding, carburizing and nitriding, quenching, or tempering.

When graphite or molybdenum disulfide is included in the sintered alloy layer 12, it serves as a dry lubricant. Further a step of impregnating a wet lubricant such as lubricating oil into the heat-treated sliding bearing 1 can be included. Preferably, the liquid lubricant used in the impregnating step is lubricating oil having ISO viscosity grade of 100–1,500, kinematic viscosity of 98–1,500 cSt at 40° C., and viscosity index of 120–50, or lubricating oil having ISO viscosity grade of 220–680, kinematic viscosity of 210–670 cSt at 40° C., and viscosity index of 90–110.

Figure 6:
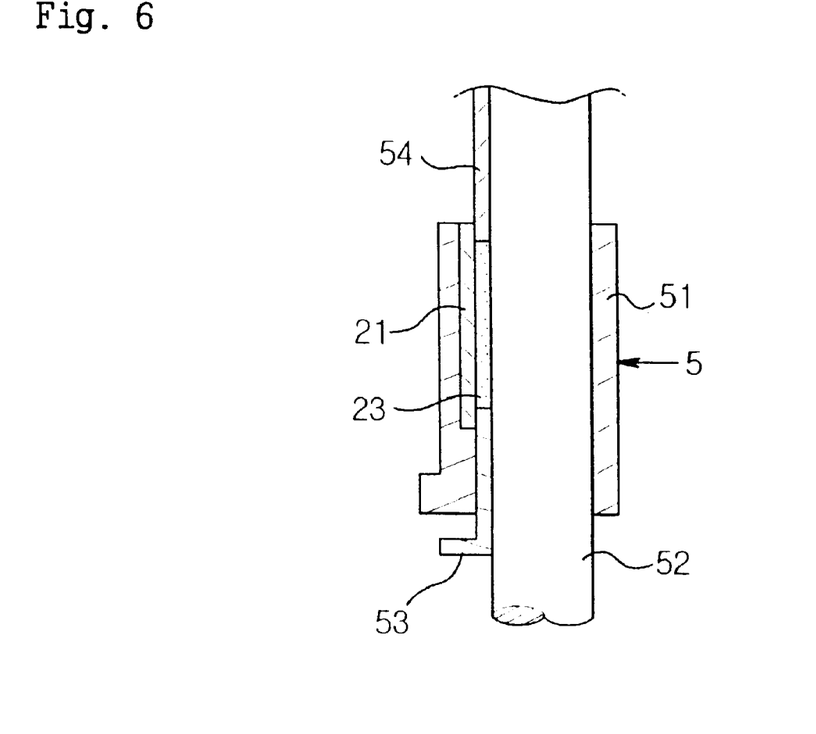
FIG. 6 is a sectional view schematically showing a press for manufacturing the sliding bearing shown in FIG. 2.

Next, a method of manufacturing the half-pipe type sliding bearing 2 will be described with reference to FIGS. 2 and 6.

The steel-backed metal layer 21 is inserted into a mold 51 of a press 5 which has a half-circular cavity, a core 52 installed at the center thereof, and a lower pressing member 53 installed at the lower portion thereof. Then, iron-based metal mixture powder is filled between the steel-backed metal layer 21 and the mold 51, and an upper pressing member 54 is inserted into the upper portion of the mold 51 and presses the iron-based metal mixture powder to form a molded body 23. The molded body 23 is sintered together with the steel-backed metal 21 under the same conditions as described above so that the sliding bearing 2 having the sintered alloy layer 22 formed on the steel-backed metal layer may be manufactured. Since the other steps are the same as in the method for manufacturing a bush type sliding bearing, a detailed description thereof is omitted. Also, by dividing the bush type sliding bearing 1 into two halves, two half-pipe type sliding bearings can be obtained.

Figure 7:
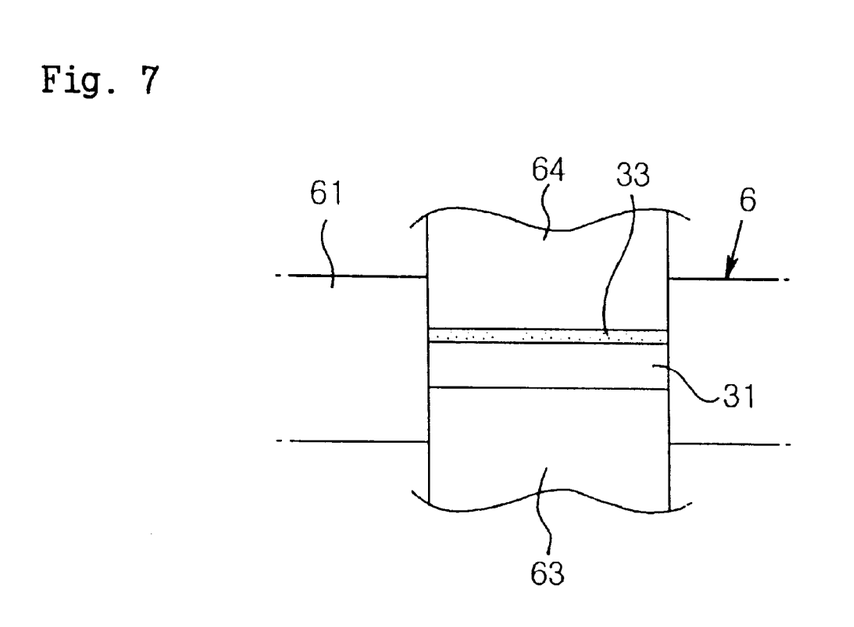
FIG. 7 is a sectional view schematically showing a press for manufacturing the sliding bearing shown in FIG. 3.

Next, a method of manufacturing the plate type sliding bearing 3 will be described, with reference to FIGS. 3, 7, and 8.

In this method, metal mixture powder having the above composition ratio is sintered to the copper-plated steel-backed metal layer 31 of a plate type to a predetermined thickness and concurrently bonded to form the iron-based sintered alloy layer 32. As shown in FIG. 7, the steel-backed metal layer 31 is placed on a mold (die) 61 of a press 6 having a rectangular cavity where a lower pressing member 63 is inserted in the lower portion thereof.

Then, metal mixture powder having the above composition ratio is placed on the steel-backed metal layer 31 and an upper pressing member 64 is inserted into the upper portion of the mold 61. The upper and lower pressing members 64 and 63 press the metal mixture powder to form a molded body 33.

Then, the molded body 33, together with the steel-backed metal layer 31, is kept under a predetermined gas atmosphere at predetermined temperature for predetermined time as above-described so that the molded body 33 is sintered and concurrently bonded to the steel-backed metal layer 31 to form the sintered alloy layer 32.

Figure 8:
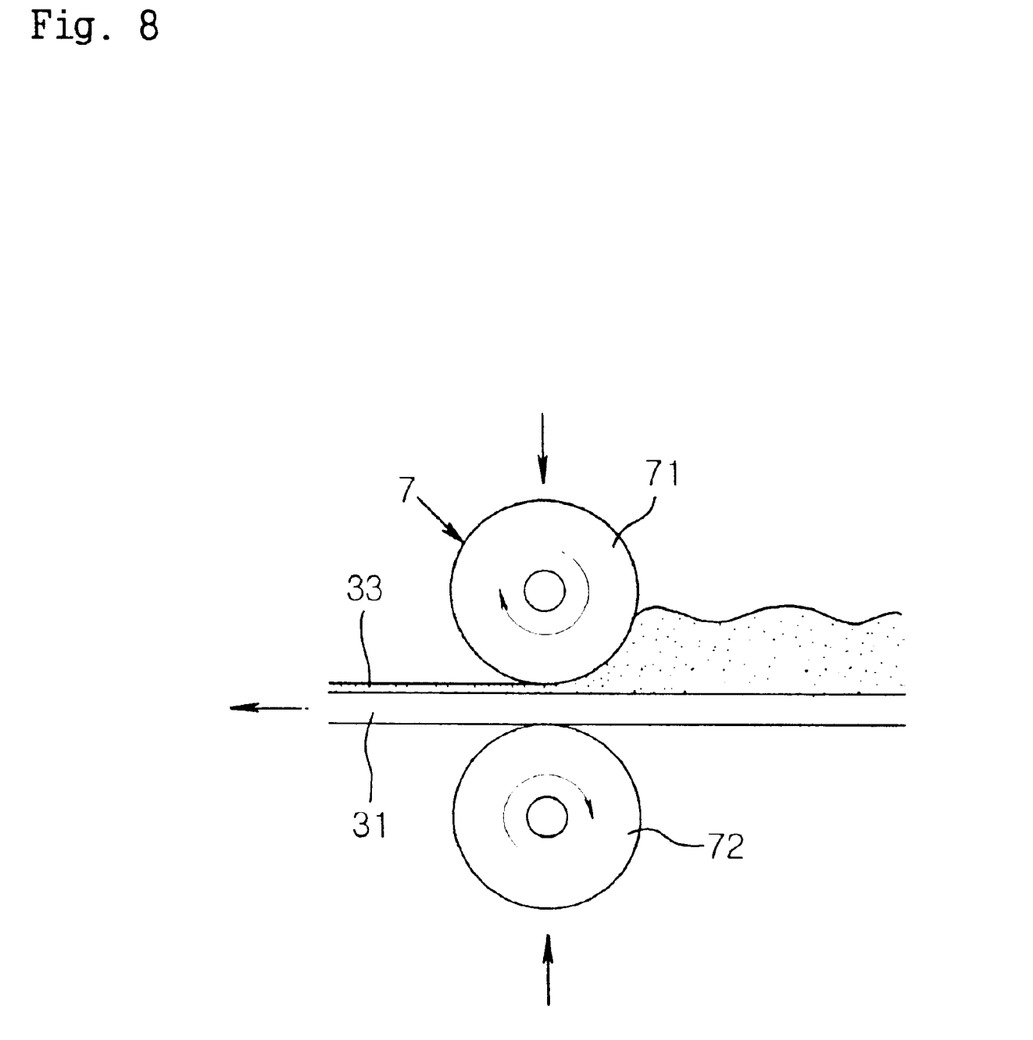
FIG. 8 is a sectional view schematically showing a rolling mill for manufacturing the sliding bearing shown in FIG. 3.

Alternatively, as shown in FIG. 8, a rolling mill 7 can be used, that is, the steel-backed metal layer 31 is placed on the rolling mill 7 and the metal mixture powder of the above composition ratio is placed thereon.

Then, the steel-backed metal layer 31 having the metal mixture powder placed thereon passes between upper and lower pressing rollers 71 and 72 and is maintained under a predetermined gas atmosphere at predetermined temperature for predetermined time as described-above. Thus, a molded body is sintered and concurrently bonded to the steel-backed metal layer 31, to form the iron-based alloy layer 32. If necessary, a heat treatment process or a lubricant impregnating step is applied as in the method for manufacturing the bush type sliding bearing.

In the method of manufacturing the plate type sliding bearing 3, the sintering temperature and the maintenance time are preferably in ranges of 1,065° C.–1,250° C. and 3–35 minutes, respectively, unlike the bush type or half-pipe type sliding bearing manufacturing method. Under such conditions, defective bonding does not occur caused by the difference in relative contraction rate and thermal expansion between the sintered alloy layer 32 and the steel-backed metal layer 31. Also, the defective bonding does not occur when the metal mixture powder satisfies the condition of the above-described composition ratio. If the condition is not met, bonding is not made as desired. That is, when a sintering/bonding (i. e. sinter-bonding) process is performed out of the above condition, in the plate type sliding bearing 3, unlike the bush type sliding bearing 1, the middle portion of the boundary surface is bonded while defectiveness that the edge portion thereof is debonded or the entire surface is not bonded occurs. The latter defectiveness occurs due to the composition ratio of the metal mixture powder, as described above.

Preferred Embodiment 1

Metal mixture powder consisting of iron of 74 wt %, copper of 25 wt %, and graphite of 1 wt % is pressed by upper and lower pressure of respectively 50–300 kgf/cm$^2$ so that a molded body of 94 mm in inner diameter and 4 mm in thickness is formed. The molded body is maintained together with a steel-backed metal layer of 102 mm in inner diameter and 6 mm in thickness at the sintering temperature of 930° C.–1,100° C. for 5–60 minutes, and then is cooled, and thus a sliding bearing is manufactured. The contraction rate of the sintered alloy layer of the sliding bearing and a degree of bonding between the sintered alloy layer and the steel-backed metal layer are shown in a graph of FIG. 14.

Figure 14:
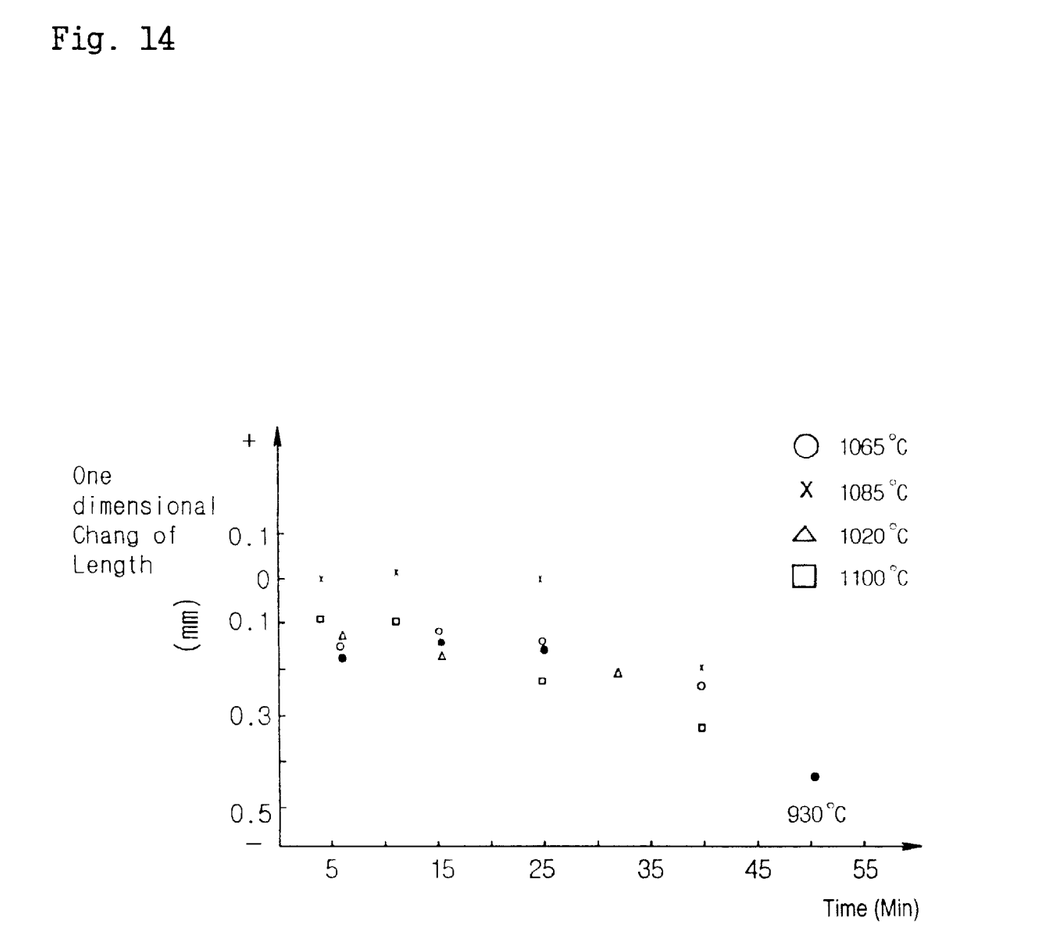
FIG. 14 is a graph showing one dimensional change in length with respect to the sintering temperature according to the first preferred embodiment of the present invention.

As shown in the graph, it can be seen that, when the conditions of sintering temperature between 1,065° C.–1,095° C. and sintering time between 3–25 minutes are kept, no contraction occurs and further bonding is made well, concurrently with sintering thereof.

Preferred Embodiment 2

Metal mixture powder mixed with iron powder of 75 wt % and copper powder of 25 wt %, and metal mixture powder mixed of iron powder of 74 wt % and copper powder 25 wt %, and graphite powder 1 wt %, are formed into a molded body of a rectangular block having a size of 150 mm in length, 50 mm in width, and 20 mm in thickness by a press using a roll-press method. The molded body is maintained together with a copper-plated steel-backed metal layer under nitrogen and hydrogen mixture gas atmosphere at the temperature between 900° C.–1,200° C. for 5–60 minutes, and then is cooled, and thus a plate type sliding bearing is manufactured. The contraction rate of the sintered alloy layer of the sliding bearing and a degree of bonding between the sintered alloy layer and the steel-backed metal layer are shown in a graph of FIG. 15. The molding pressure of 50–300 kg/cm² is applied as the respective upper and lower pressures.

Figure 15:
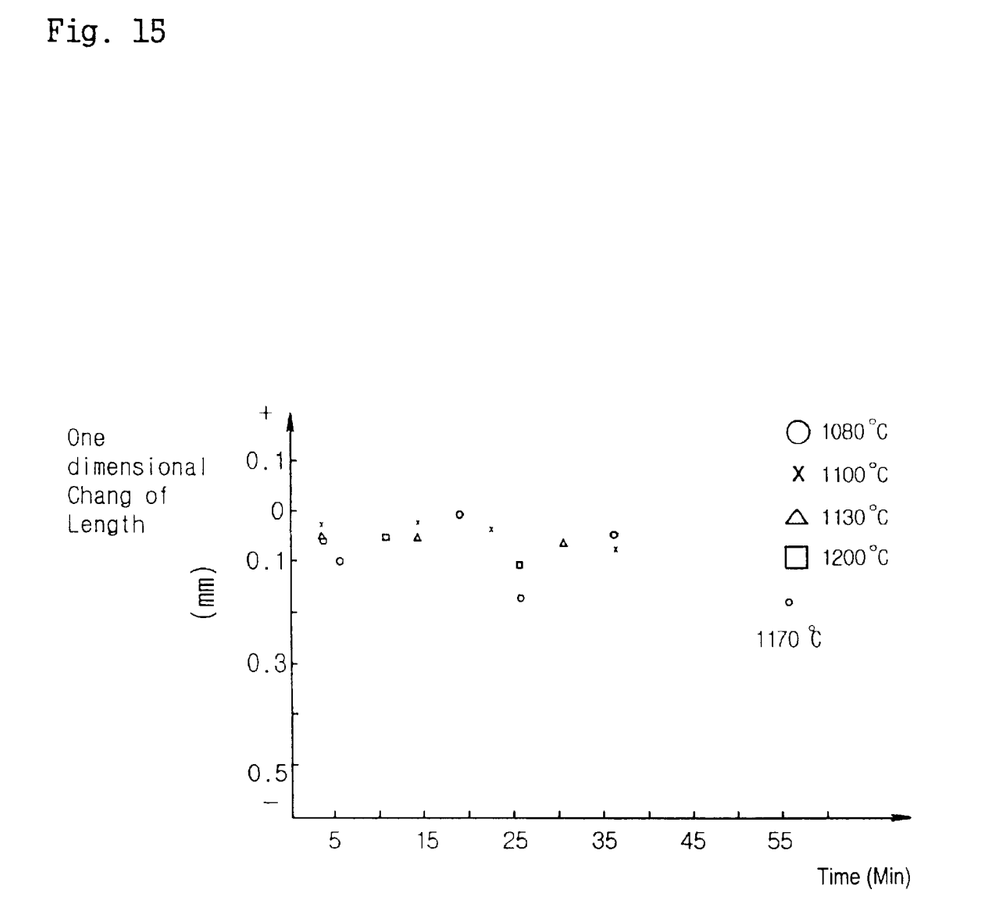
FIG. 15 is a graph showing one dimensional change in length with respect to the sintering temperature according to the second preferred embodiment of the present invention.

As shown in the graph, it can be seen that the sintering temperature and the sintering time to realize a sintering/bonding state in which defective bonding due to relative contraction and expansion rate of the sintered alloy layer do not occur are between 1,065° C.–1,250° C. and between 3–20 minutes, respectively.

As described above, the sliding bearing and its manufacturing method according to the present invention have advantages as follows.

1) Since iron-based metal mixture powder molded in contact with a steel-backed metal layer is sintered in a transition range for solid-state sintering and liquid-state sintering, the iron-based metal mixture powder is sintered into an iron-based sintered alloy layer and concurrently and easily bonded to the steel-backed metal layer.

2) Since a strength-adjustable carbon steel is selected as a back metal layer and a low-density iron-based sintered alloy having lubrication and low friction characteristics is sinter-bonded to the inner surface of the back metal layer, the sliding bearing can support load over 700 kgf/cm². Thus, the sliding bearing according to the present invention shows superior performance not only under light load and high speed conditions, but also heavy load and medium or low speed conditions.

3) When the counterpart is made of chromium-plated hardened carbon steel, kinematic frictional coefficient is maintained between 0.05–0.15 and operation temperature are maintained under 30° C.–100° C.

4) When the housing is formed of iron-based, the sliding bearing according to the present invention can be easily fitted into the housing without any troubles and does not detach from the housing even under the severe change of atmospheric temperature since it has the elastic modulus almost identical to that of the housing and a low frictional coefficient 5) There is no frictional noise during reciprocation, oscillation and rotation in contact with a shaft.

6) The sliding bearing according to the present invention shows very excellent embeddability against foreign particles or wear debris.

7) The sliding bearing according to the present invention shows excellent resistance against crack-propagation, sudden impact load and a higher fatigue limit.

8) Seizure or burning of the inner surface of sintering material with respect to the counterpart does not occur in any event during operation.

9) The sliding bearing according to the present invention shows superior conformability and compatibility with the counterpart. Thus, particularly when the counterpart is formed of hardened chromium-plated carbon steel, it is hardly damaged.

10) There is no loss of oil through the rear side of the bearing due to presence of the steel-backed metal layer. Also, since the steel-backed metal layer is present on the rear surface of the bearing, recovery rate of an lubricating oil after the bearing operates is high due to a high hydrodynamic pressure to the pores near the back metal portion compared to a bearing having no back metal layer and a general-use bearing.

11) Since the rear surface of the bearing is formed of carbon steel, welding and bonding is made possible. Also, since the width of the back metal layer of the bearing can be adjusted, the bearing itself can be formed to be a housing, or other supporters can be welded and bonded so that flexibility in design is allowed.

12) Since lubricating oil meeting the most optimal conditions is impregnated into the sliding bearing, graphite or molybdenum disulfide included in the sintered alloy layer of the sliding bearing serves as a solid lubricant and also the lubricating oil impregnated into the sliding bearing serves as liquid lubricant. Further, since the impregnated lubricating oil includes graphite or molybdenum disulfide, selectively or altogether, the sliding bearing of the present invention always operates in a combined self-lubricated condition, the frictional coefficient with respect to the counterpart is very low, equivalent to the value of 0.05 or less, and the frictional coefficient is stably maintained in spite of the conditions of the extremely high static pressure and dynamic loads, thereby improving lubrication characteristic.

13) According to the grease supply structure of the present invention, since grease is smoothly supplied to the boundary surface between the sintered alloy layer and the sliding counterpart and remains in a large amount, the lubrication characteristic is superior and also an effect of combined self-lubricating operation increases the grease refilling period such that the grease refilling period is extended up to the minimum 300 hours to 1,000 hours. The grease refill period can be nearly permanent according to a method of designing the bearing. Further, even when grease refilling is needed, graphite or molybdenum disulfide which is a solid lubricant hardly leak out and remains in the inner ring-shape groove, so that the bearing can be maintained by refilling only grease.

What is claimed is:

1. A sliding bearing comprising:
    a steel-backed metal layer; and
    an iron-based sintered alloy layer comprising copper of 10–30 wt %, a solid lubricant and iron for the residue, the solid lubricant comprising at least one of graphite 0.1–6.5 wt % and molybdenum disulfide 0.1–7.0 wt %, said iron-based sintered alloy layer being sintered and concurrently bonded to said steel-backed metal layer at a temperature of 1,065–1095° C.

2. The sliding bearing as claimed in claim 1, wherein said iron-based sintered alloy layer further comprises tin of 2–15 wt %, nickel of 2–15 wt %, or manganese of 2–5 wt %.

3. The sliding bearing as claimed in claim 1, wherein the iron-based sintered alloy layer further comprises liquid lubricant impregnated therein.

4. The sliding bearing as claimed in claim 3, wherein the liquid lubricant comprises a lubricating oil having ISO viscosity grade of 100–1,500, kinematic viscosity of 98–1, 500 cSt at 40° C., and viscosity index of 120–50, or a lubricating oil having ISO viscosity grade of 220–680, kinematic viscosity of 210–670 cSt at 40° C., and viscosity index of 90–110.

5. The sliding bearing as claimed in claim 3, wherein powders of at least one of graphite and molybdenum disulfide are suspended in the liquid lubricant, the powders having grain size less than 200 µm.

6. The sliding bearing as claimed in claim 1, wherein said sliding bearing further comprises:
    a housing having an inlet formed on an outer surface of said steel-backed metal layer for supporting said sliding bearing;
    an annular guide groove formed along an outer circumferential surface of said steel-backed metal layer at a position corresponding to said inlet;

a plurality of holes radially penetrating said steel-backed metal layer along said guide groove;

liquid lubricant impregnated into said iron-based sintered alloy layer, said liquid lubricant having ISO viscosity grade of 100–1,500, kinematic viscosity of 98–1,500 cSt at 40° C., and viscosity index of 120–50; and powders of at least one of grahite and molybdenum disulfide, the powders being suspended in the liquid lubricant and having grain size less than 200 μm.

7. The sliding bearing as defined in claim 1, wherein the sintering of the alloy layer and the concurrent bonding at the temperature of 1065–1095° C. is performed for 3–25 minutes.

8. The sliding bearing as defined in claim 1, wherein before the sintering, a mixture comprising the copper, the solid lubricant and the iron is compacted under the pressure of 50–300 kg/cm$^2$.

* * * * *